United States Patent
Inoue et al.

(10) Patent No.: US 8,600,608 B2
(45) Date of Patent: Dec. 3, 2013

(54) COMMUNICATION SYSTEM FOR VEHICLE

(75) Inventors: Hiroki Inoue, Anjo (JP); Yuichi Ochiai, Toyota (JP); Tomohiro Kani, Toyota (JP); Ichiro Usami, Anjo (JP); Takashi Wada, Okazaki (JP)

(73) Assignees: Denso Corporation, Kariya (JP); Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 171 days.

(21) Appl. No.: 13/235,655

(22) Filed: Sep. 19, 2011

(65) Prior Publication Data

US 2012/0072069 A1    Mar. 22, 2012

(30) Foreign Application Priority Data

Sep. 22, 2010   (JP) ................................. 2010-212248

(51) Int. Cl.
    G06F 7/00        (2006.01)
(52) U.S. Cl.
    USPC ....... 701/29.1; 701/29.6; 701/31.4; 701/32.8; 701/33.4; 701/108; 123/479; 123/520; 123/676; 123/698; 340/459; 340/438; 340/439
(58) Field of Classification Search
    USPC ....... 701/29.6, 31.4, 32.8, 33.4, 33.9, 36, 99, 701/102, 108, 114, 115; 123/198 D, 479, 123/520, 676, 698; 340/404, 438, 439, 459; 73/114.61; 280/735; 180/404; 307/10.1
    See application file for complete search history.

(56) References Cited

U.S. PATENT DOCUMENTS

| 4,825,362 | A  | * | 4/1989 | Minami et al. ................ 709/233 |
| 7,432,959 | B2 | * | 10/2008 | Ueda .......................... 348/221.1 |
| 7,523,237 | B2 | * | 4/2009 | Gerig ............................ 710/105 |
| 2005/0107964 | A1 | | 5/2005 | Wakairo |
| 2005/0251604 | A1 | * | 11/2005 | Gerig .......................... 710/120 |
| 2007/0083303 | A1 | * | 4/2007 | O'Sullivan et al. ............ 701/29 |
| 2010/0302974 | A1 | * | 12/2010 | Niiyama et al. .............. 370/254 |
| 2011/0153151 | A1 | * | 6/2011 | Rogers et al. ................... 701/33 |
| 2011/0231053 | A1 | * | 9/2011 | Kuramochi et al. ........... 701/29 |
| 2011/0292439 | A1 | * | 12/2011 | Nagata et al. ................ 358/1.15 |

FOREIGN PATENT DOCUMENTS

| JP | A-01-131466 | 5/1989 |
| JP | A-2004-322801 | 11/2004 |
| JP | A-2005-7999 | 1/2005 |
| JP | A-2007-290540 | 11/2007 |

* cited by examiner

*Primary Examiner* — McDieunel Marc

(74) *Attorney, Agent, or Firm* — Posz Law Group, PLC

(57) ABSTRACT

A communication system for a vehicle includes: a plurality of controllers mounted on the vehicle; a data communication network for coupling the plurality of controllers with each other so that the controllers transmit data to and receive data from each other via the data communication network; a failure diagnosis device for diagnosing whether each controller is normal; a failure diagnosis activation device for activating the failure diagnosis device; and an avoiding condition setting device for setting an avoiding condition, which provides to avoid execution of the failure diagnosis when the failure diagnosis device is activated.

6 Claims, 4 Drawing Sheets

COMMUNICATION SYSTEM FOR VEHICLE

CROSS REFERENCE TO RELATED APPLICATION

This application is based on Japanese Patent Application No. 2010-212248 filed on Sep. 22, 2010, the disclosure of which is incorporated herein by reference.

TECHNICAL FIELD

The present invention relates to a communication system for a vehicle, in which multiple controllers mounted on vehicles are coupled with each other via a data communication network so that the controllers transmit data to and receive data from each other via the network.

BACKGROUND

In a communication system for a vehicle, failure caused by various combinations attributed to a large amount of information may occur. For example, even if a user finds failure of one controller before the user takes a vehicle to an auto repair shop, the auto repair shop may not find the failure during failure diagnosis at the auto repair shop. To solve such an incident, a device disclosed in JP-A-2007-290540 is proposed. In the device, a communication history of data transmitted and received from the vehicle via a network is stored, and the failure diagnosis of a controller is performed with using the communication history. The diagnosis result is displayed on a display device, and stored in the device. In this case, the failure controller is easily specified based on the diagnosis result.

In a case where a communication system for a vehicle, which is capable of performing failure diagnosis, is used under a certain special condition, for example, in a case where the communication system is used under a condition that only a part of in-vehicle devices other than the controller is energized from a power source, the device may determine that the controller may be down even though the controller is normal. Specifically, when the failure diagnosis of the communication system is performed, the device may store the failure history of the controller such that the controller is not normal since the controller not energized from the power source cannot transmit and receive data via the network. The certain special condition realizes, for example, when the vehicle is shipped on a car carrier for export. In this case, in order to reduce discharge of a battery, only minimum in-vehicle devices are energized from the power source. The minimum in-vehicle devices such as a starter, an engine ECU and an air conditioner are necessary to operate the vehicle when an engine of the vehicle runs. Thus, in general, the communication device for the vehicle is not energized. In some cases, the communication device may be energized, for example, when the communication device performs an operation function of the air conditioner.

If a mechanic of a car dealer in an export country checks the vehicle, which has been used under a condition that the part of in-vehicle devices is energized from the power source, the mechanic finds the failure history of the vehicle. In this case, the mechanic considers that the controller corresponding to the failure history is down. Further, the mechanic may replace the controller with a new one. Since the controller is normal although the controller is not energized from the power source, the failure history should be deleted.

SUMMARY

In view of the above-described problem, it is an object of the present disclosure to provide a communication system for a vehicle, which prevents from storing failure history of improper diagnosis such that an in-vehicle device coupled with a network is down under a special condition.

According to an aspect of the present disclosure, a communication system for a vehicle includes: a plurality of controllers mounted on the vehicle; a data communication network for coupling the plurality of controllers with each other so that the controllers transmit data to and receive data from each other via the data communication network; a failure diagnosis device for diagnosing whether each controller is normal; a failure diagnosis activation device for activating the failure diagnosis device; and an avoiding condition setting device for setting an avoiding condition, which provides to avoid execution of the failure diagnosis when the failure diagnosis device is activated.

In the above system, when the avoiding condition is set, the system does not mistake to diagnose one controller as a failure controller even if the one controller is not energized.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
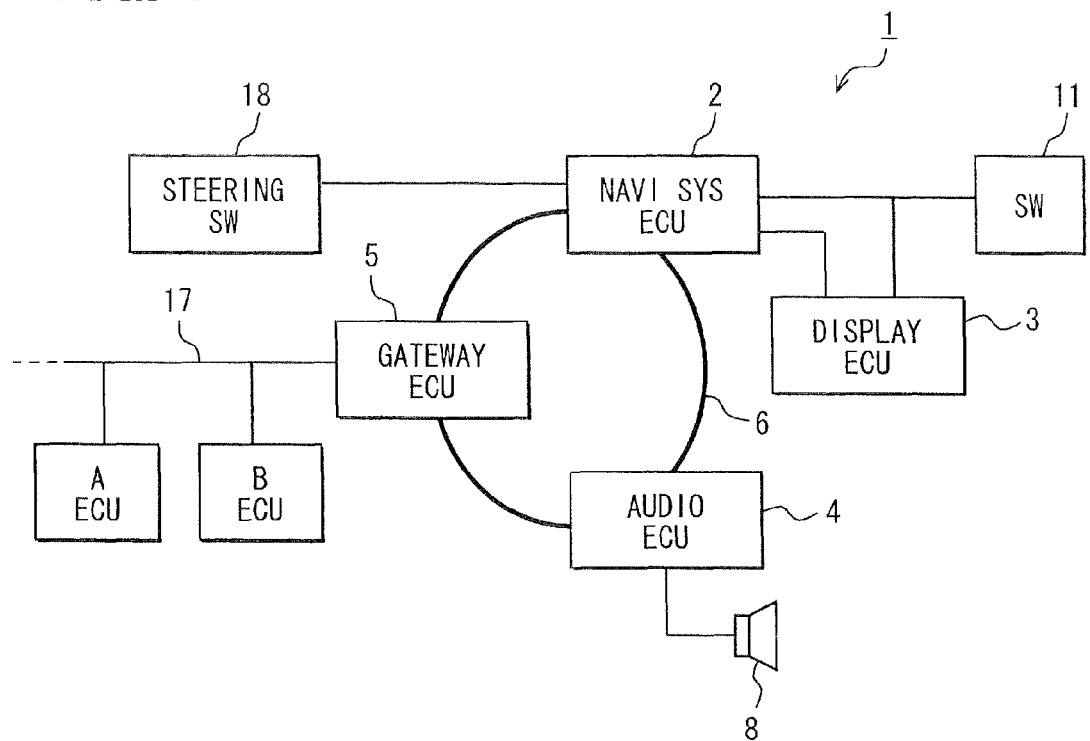
FIG. 1 is a block diagram showing a communication system for a vehicle.

FIG. 1 shows a block diagram of a communication system 1 for a vehicle according to a present embodiment.

The communication system 1 includes a navigation system ECU 2 having a route guiding function based on a determined route, an audio ECU 4 having a playing function of music medium such as a CD, and a gateway ECU 5, which are coupled with each other via an information network 6 for communication mounted on a vehicle. Further, each ECU 2, 4-5 transmits data to and receives data from each other via the network 6. Each ECU 2, 4-5 provides a controller. The network 6 provides a network for data communication.

Here, the navigation system ECU 2 is coupled with a display ECU 3 via a communication line. The display ECU 3 has a display function of various image data. In some cases, the navigation system ECU 2 may not transmit an image signal from and receive an image signal to the display ECU 3 via the network 6, but transmit an image signal from and receive an image signal to the display ECU 3 via the communication line. Alternatively, the display ECU 3 may be arranged on the network 6 so that the navigation system ECU 2 transmits an image signal from and receives an image signal to the display ECU 3 via the network 6. Operation switches 11 are coupled with the navigation system ECU 2, the display ECU 3 and the audio ECU 4. An user operates the switches 11 so that an instruction signal is input into each ECU 2-4. The navigation system ECU 2 and the display ECU 3 provide an in-vehicle navigation device. The navigation device has various functions such as a failure diagnosis function, a failure diagnosis activation function, and an avoiding condition setting function. The audio ECU 4 is coupled with a speaker 8. The speaker 8 outputs sound reproduced by the audio ECU 4.

In the present embodiment, the network 6 is a network having a ring topology. For example, the network 6 is a MOST (media oriented system transport) network. In the present embodiment, the navigation ECU 2, the audio ECU 4 and the gateway ECU 5 are coupled with the network 6. Alternatively, other electronic control devices such as a ground wave broadcasting TV tuner, a ground wave broadcasting radio tuner and a satellite broadcasting tuner may be coupled with the network 6. One or more gateway ECUs 3 or one or more control devices having the same function as the gateway ECU 5 may be arranged on the network 6.

Figure 2:
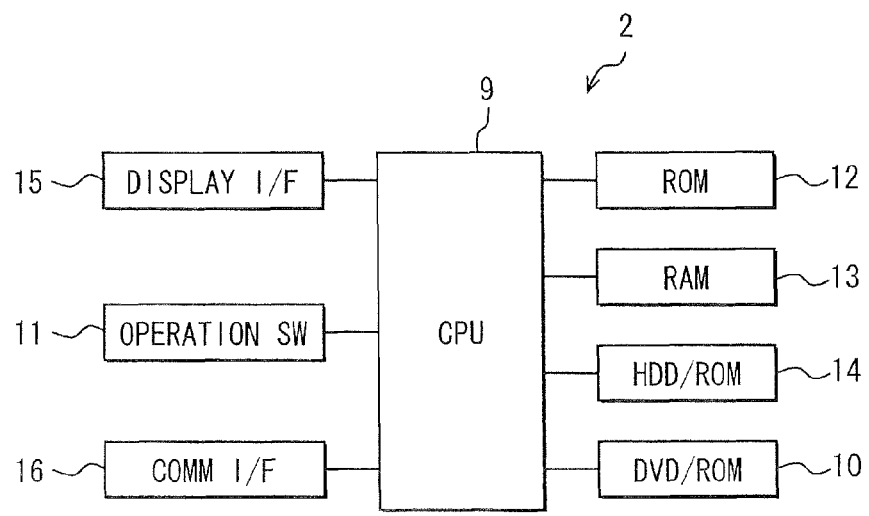
FIG. 2 is a block diagram showing a navigation system.

As shown in FIG. 2, the navigation system ECU 2 includes a CPU 9, a position detector (not shown) for detecting a current position of the vehicle, a DVD-ROM 10 and/or a HDD-ROM 14 for storing map data, operations witches 11, an external memory and/or the HDD-ROM 14 for storing various information such as route information set by the user, a remote control sensor, a ROM 12 for storing an application program, a RAM 13 for executing the application program, the HDD-ROM 14 for storing data log as communication history transmitted via the network 6, a display I/F 15, a communication I/F 16, and an I/O device, which are coupled with each other via a bus line. The CPU 9 controls all application programs of the navigation system ECU 2. Various instruction signals are input by the user into the ECU 2 via the operation switches 11. Various instruction signals are input by the user into the ECU 2 via the remote control sensor and a remote controller. The display I/F 15 outputs an image signal generated by the CPU 9 to an outside device such as the display ECU 3. The communication I/F 16 transmits and receives a control signal and/or a synchronous signal, which are transmitted on the network 6. The communication I/F 16 separates the control signal and the synchronous signal into a control signal and an audio signal, and communicates with the CPU 9. Here, the position detector and the like in the ECU 2 are well known.

The display I/F 15 is coupled with the display ECU 3 via the communication line. Thus, the CPU 9 transmits and receives the image signal with the display ECU 3 via the display I/F 15 and the communication line. The communication I/F 16 is connected to the network 6. Thus, the CPU 9 transmits and receives the control signal, the audio signal and the like with other ECUs via the communication I/F 16 and the network 6.

In the present embodiment, the ROM 12 is a flash memory. Alternatively, the ROM 12 may be any memory having a rewritable non-volatile memory area. Further, the HDD-ROM 14 is a flash memory or a hard disk drive. Alternatively, the HDD-ROM 14 may be any memory having a rewritable non-volatile memory area.

The CPU 9 executes various processes such as a route setting process, and controls various elements. Specifically, the CPU 9 executes a map display process and a route search process according to a program stored in the ROM 12 and the RAM 13. In the map display process, the CPU 9 calculates a current position of the vehicle based on various detection signals from the position detector, and controls the display device to display a map around the current position of the vehicle, which is obtained from a map data input device. The information of the current position of the vehicle includes coordinates of the current position and a traveling direction of the vehicle. In the route search process, the CPU 9 selects a facility as a destination according to an operation of operations witches and a remote controller based on address data stored in the map data input device, and searches automatically an optimum route from the current position to the destination. The optimum route represents a destination route. Further, the CPU 9 obtains data log transmitted via the network 6 as a communication history from the communication I/F 15, and controls the HDD-ROM 14 to store the data log.

As shown in FIG. 1, the gateway ECU 5 is coupled with the network 6 via a communication I/F (not shown). Further, the gateway ECU 5 is also coupled with a control network such as a CAN (controller area network) via another communication I/F (not shown). A control network 17 is coupled with various ECUs mounted on the vehicle. Various ECUs transmit and receive information (i.e., communicate) with the gateway ECU 5 via the control network 17 so that each ECU can communicate with the navigation system ECU 2. The control network 17 provides a data communication network.

A steering switch 18 is coupled with the navigation system ECU 2. The steering switch 18 functions as an operation switch for the navigation system ECU 2. An user operates the steering switch 18 to input various instructions into the navigation system ECU 2. Thus, various operation signals are input into the navigation system ECU 2 via the steering switch 18. Here, the steering switch 18 may be coupled with the control network 17 as a multi-signal line.

Next, operation of the communication system 1 will be explained with reference to FIGS. 3 to 7.

Figure 3:
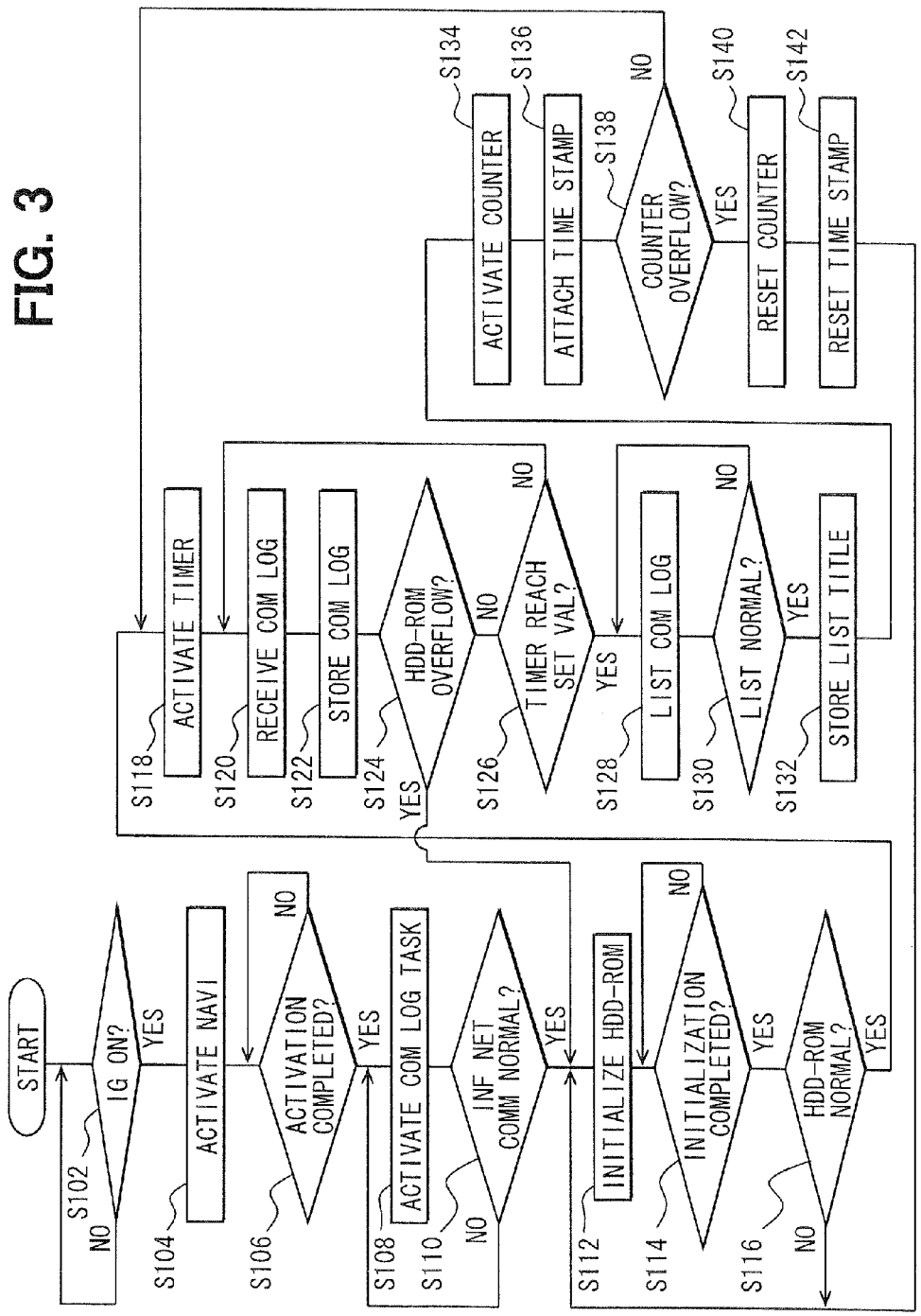
FIG. 3 is a flowchart showing a control process for storing communication history.

First, an initial operation process for storing the data log as the communication history, which is transmitted via the information network 6, will be explained with reference to FIG. 3. Here, a function for storing the data log is defined as a drive recording function. The drive recording function is executed by the CPU 9 of the navigation system ECU 2.

In the initial operation process of the drive recording function, when an ignition switch of the vehicle turns on, an accessory power source turns on in step S102. Thus, the initial operation process is executed when the navigation system ECU 2 is energized. The drive recording function is one of application programs of the navigation system ECU 2. After it is confirmed that the navigation system ECU 2 is activated in steps S104 and S106, various data transmitted via the information network 6 is automatically obtained. Specifically, the navigation system ECU 2 executes an activation sequence step so that the ECU 2 communicates with the gateway ECU 5. Thus, the ECU 2 connects to the information network 6. Then, the ECU 2 activates a navigation application program, and then, the ECU 2 waits for a user operation in step S108.

Then, when it is determined that the communication log task of the information network is activated, it is confirmed whether the information network communication is normally performed in step S110. When the determination in step S110 is "YES," a log storing area of the HDD-ROM 14 is initialized in step S112. After the log storing area is initialized, i.e., when the determination in step S114 is "YES," it is confirmed in step S116 whether the log storing area of the HDD-ROM 14 functions normally. Then, a timer is activated in step S118. The communication log of the information network is obtained and stored in the log storing area of the HDD-ROM 14 in step S120. Here, since a memory capacity of the log storing area of the HDD-ROM 14 is finite, when a memory capacity of a predetermined area is full, old data is deleted, and then, a new communication log of the information network is obtained and stored in the log storing area of the HDD-ROM 14. Specifically, in step S120, the communication log of the information network is received, and then, the communication log is stored in step S122. In step S124, it is conformed whether the log storing area of the HDD-ROM 14 overflows with the communication log. When it is confirmed that the log storing area of the HDD-ROM 14 does not overflow, i.e., when the determination of step S124 is "NO," it goes to step S126. In step S126, it is confirmed whether the timer reaches a predetermined timer setting value. When the timer does not reach the setting value, i.e., when the determination of step S126 is "NO," it goes to step S120. Thus, until the log storing area of the HDD-ROM 14 overflows, and the timer reaches the setting value, the log storing area of the HDD-ROM 14 continues to store the communication log. When the timer reaches the setting value, i.e., when the determination of step S126 is "YES," the communication log stored in the log storing area of the HDD-ROM 14 is listed in step S128. When the listing step is normally performed, i.e., when the determination of step S130 is "YES," it goes top step S132. In step S132, a title of the list is stored as communication history in the ROM 12. Thus, when the communication log is listed, confirmation of the stored communication log is easily performed after that.

Here, a memory capacity of a list title storing area of the ROM 12 is also finite. Thus, in step S134, a counter is activated. A time stamp is attached to a command sequence for storing the list in step S136. When the counter overflows, i.e., when a memory capacity of a predetermined area is full, (i.e., when the determination of step S138 is "YES,") it goes to step S140. In steps S140 and S142, the counter and the time stamp are reset. Then, it goes to step S112 so that the log storing area of the HDD-ROM 14 is initialized.

The communication system 1 has a failure diagnosis function. The failure diagnosis function is executed by the CPU 9 of the navigation system ECU 2. Further, the failure diagnosis function can be performed by a mechanic of a car dealer when the vehicle is delivered or taken in the car dealer. The failure diagnosis function cannot be performed by an ordinary user, in general.

Accordingly, when a predetermined special key operation is performed on an activation screen of the navigation system ECU 2, the failure diagnosis function is performed.

In the present embodiment, the navigation system ECU 2 can set an avoiding condition of the failure diagnosis function. Under a condition that the ECU 2 sets the avoiding condition, the failure diagnosis function is not executed even when the mechanic of the car dealer executes the predetermined special key operation on the activation screen of the navigation system ECU 2. The avoiding condition is defined as a special condition.

Figure 4:
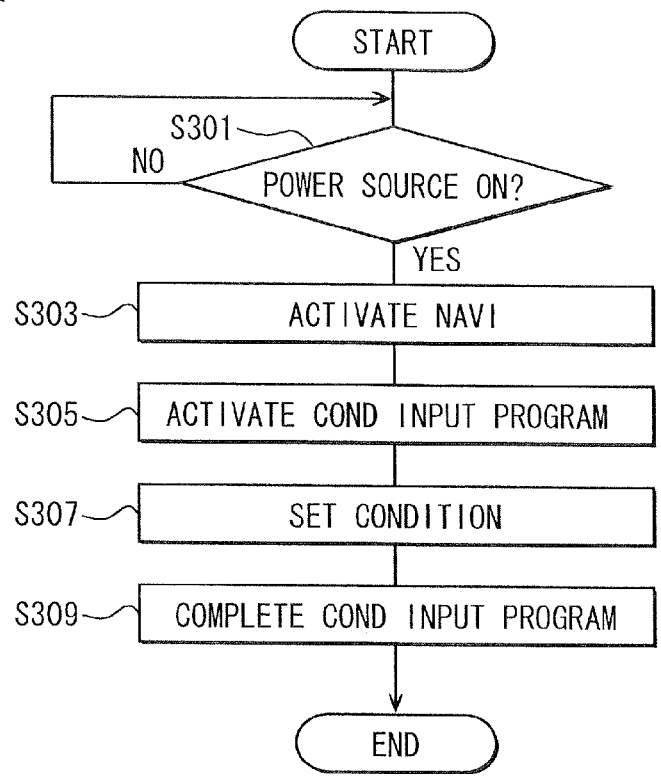
FIG. 4 is a flowchart showing a control process for setting a special condition.
Figure 5:
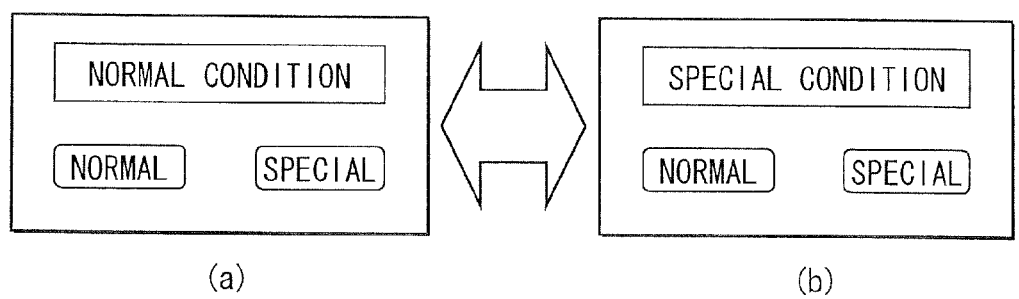
FIG. 5A is a diagram showing a display screen, in which a normal condition is selected.
FIG. 5B is a diagram showing a display screen, in which a special condition is selected.

Here, a process for setting and cancel the special condition will be explained with reference to FIGS. 4 and 5. In step S301 of FIG. 4, when a power source turns on, i.e., when an accessory switch and an ignition switch turn on, the navigation system ECU 2 is activated in step S303. Then, when the special key operation for the special condition setting and canceling process is performed on the activation screen of the ECU 2, a condition input function as an application program is activated in step S305.

Then, it goes to step S307. In step S307, the special condition is set or cancelled. In this case, when the normal condition is preliminary set, as shown in FIG. 5A, the display ECU 3 controls the display to display a display screen in FIG. 5A. Under a condition that the display screen in FIG. 5A is displayed, when the special key operation is performed, the special condition is set. After that, a display screen in FIG. 5B is displayed. Accordingly, when the communication system 1 of the vehicle is used under a special situation, for example, when only a part of the in-vehicle devices are energized, for example, when the vehicle is shipped on a car carrier for export, the process for setting and cancel the special condition is executed so that the special condition is set. Here, in step S307, when the special condition is already set, the display screen in FIG. 5*b* is displayed. Under a condition that the display screen in FIG. 5B is displayed, when a normal key operation is performed, the normal condition is set, and then, the display screen in FIG. 5A is displayed. Then, it goes to step S309. When the condition input program is completed, the process for setting and cancel the special condition ends.

Figure 6:
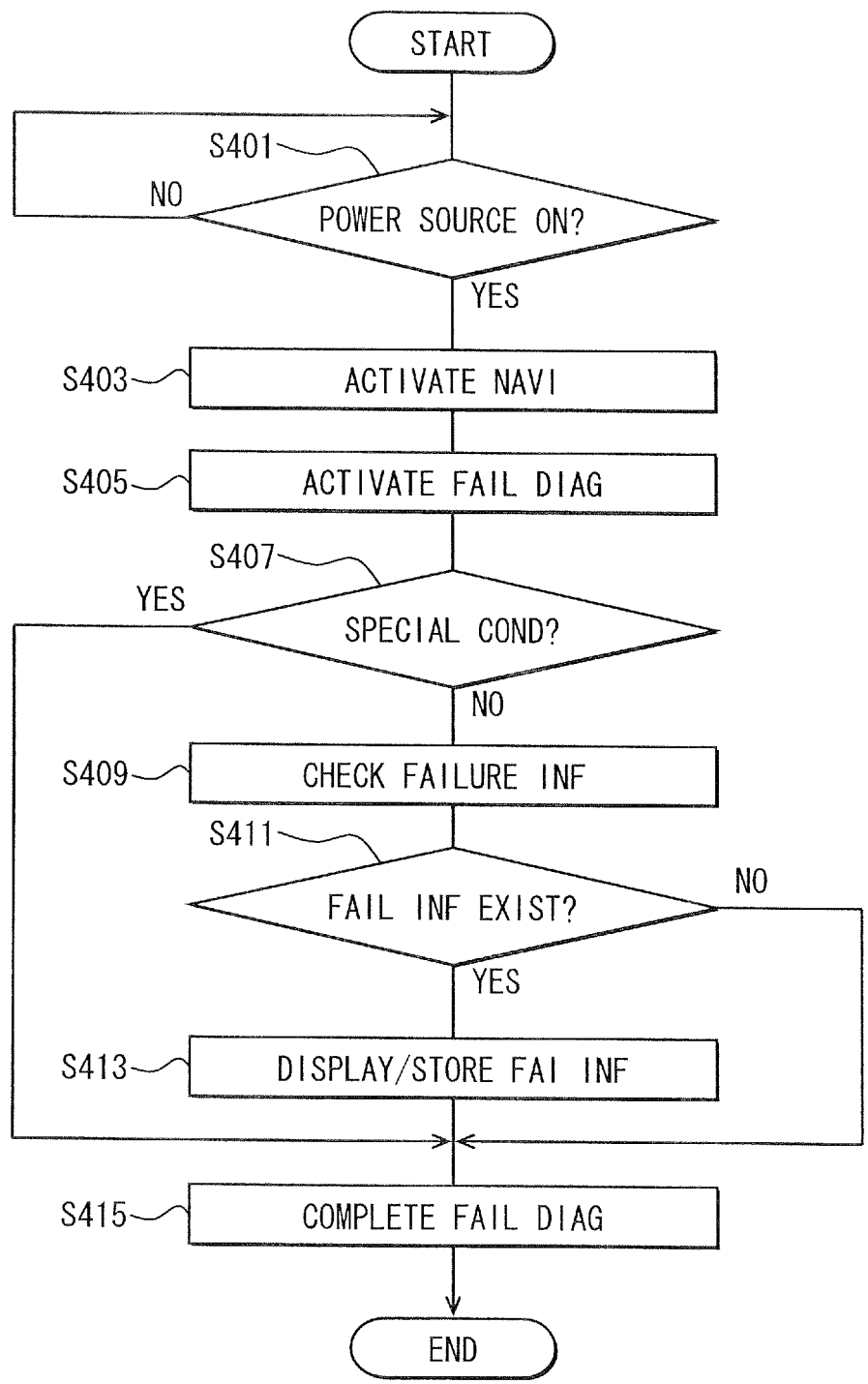
FIG. 6 is a flowchart showing a control process of failure diagnosis.

Next, a process for executing the failure diagnosis by the CFU 96 of the navigation system ECU 2 will be explained with reference to FIG. 6. In step S401 of FIG. 6, when the power source turns on (i.e., when the accessory power source and the ignition switch turn on), it goes to step S403. In step S403, the navigation system ECU 2 is activated. Then, the failure diagnosis function as an application program is activated in step S405 when the special key operation for executing the failure diagnosis function is performed on the activation screen of the navigation system ECU 2.

In step S407, it is determined whether the special condition is set. When the special condition is preliminary set, i.e., when the determination of step S407 is "YES," it goes to step S415. In step S415, the failure diagnosis function program ends without executing the failure diagnosis process.

In step S407, when the normal condition is set, i.e., when the determination of step S407 is "NO," it goes to step S409. In step S409, the failure diagnosis function program is executed. Based on the stored communication history, the system 1 diagnoses whether each ECU as a controller connected to the information network 6 or the control network 17 is damaged, i.e., out of order. When one ECU is out of order, the failure information is stored. The failure diagnosis function to be executed may be a conventional failure diagnosis function disclosed in JP-A-2007-290540 or other failure diagnosis functions.

Then, it goes to step S411. In step S411, it is determined whether the failure information exists. When the failure information exists, it goes to step S413. In step S413, the failure information is displayed, and further, the failure information is noticed to the user audibly. Further, the failure information is stored in the HDD-ROM 14 as the failure history. Then, it goes to step S415. In step S415, the failure diagnosis function program ends.

In the present embodiment, the special condition for prohibiting the failure diagnosis function is settable. Thus, when the system 1 is used under a special situation, for example, when only a part of the in-vehicle devices are energized, as shown in FIGS. 4 and 5, the user can set the above special condition so that the failure diagnosis function is not executed. Thus, when the vehicle is used under a special situation, and the user requests to execute the failure diagnosis function, the failure diagnosis function is not executed actually. Thus, even if the other part of the in-vehicle devices are not energized, the failure history of the other part of the in-vehicle devices is not stored. Accordingly, for example, when a mechanic of a car dealer in an export country checks the vehicle, which has been used under a condition that the part of in-vehicle devices is energized from the power source, the mechanic does not misunderstand that the other part of the in-vehicle devices not energized are out of order. Further, the mechanic does not replace mistakenly the other part of the in-vehicle devices with new ones.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A communication system for a vehicle comprising:
a plurality of controllers mounted on the vehicle;
a data communication network for coupling the plurality of controllers with each other so that the controllers transmit data to and receive data from each other via the data communication network;
a failure diagnosis device for diagnosing whether each controller is normal;
a failure diagnosis activation device for activating the failure diagnosis device; and
an avoiding condition setting device for setting an avoiding condition, which provides to avoid execution of failure diagnosis when the failure diagnosis device is activated, wherein
the plurality of controllers includes an in-vehicle navigation device,
the in-vehicle navigation device provides the failure diagnosis device, the failure diagnosis activation device and the avoiding condition setting device,
the in-vehicle navigation device displays an initial screen when the in-vehicle navigation device turns on, and
the in-vehicle navigation device controls the avoid condition setting device to set the avoiding condition when a predetermined special key operation is performed on the initial screen.

2. The communication system according to claim 1, wherein the avoiding condition setting device has a function for canceling the avoiding condition.

3. The communication system according to claim 1, wherein the in-vehicle navigation device controls the failure diagnosis activation device to activate the failure diagnosis device when another predetermined special key operation is performed on the initial screen.

4. The communication system according to claim 3, wherein the in-vehicle navigation device determines whether the avoiding condition is met,
wherein the failure diagnosis device executes the failure diagnosis when the in-vehicle navigation device determines that the avoiding condition is not met, and
wherein the failure diagnosis device does not execute the failure diagnosis when the in-vehicle navigation device determines that the avoiding condition is met.

5. The communication system according to claim 3, wherein the in-vehicle navigation device determines whether the avoiding condition is met,
wherein the failure diagnosis device executes the failure diagnosis, when both of the in-vehicle navigation device determines that the avoiding condition is not met and the failure diagnosis device is activated by the another predetermined special key operation performed on the initial screen, and
wherein the failure diagnosis device does not execute the failure diagnosis when the in-vehicle navigation device determines that the avoiding condition is met.

6. The communication system according to claim 5, wherein the avoiding condition setting device has a function for canceling the avoiding condition.

* * * * *